J. W. THROPP.
TIRE WRAPPING AND UNWRAPPING MACHINE.
APPLICATION FILED JAN. 19, 1912.
1,031,491.
Patented July 2, 1912.
4 SHEETS—SHEET 1.
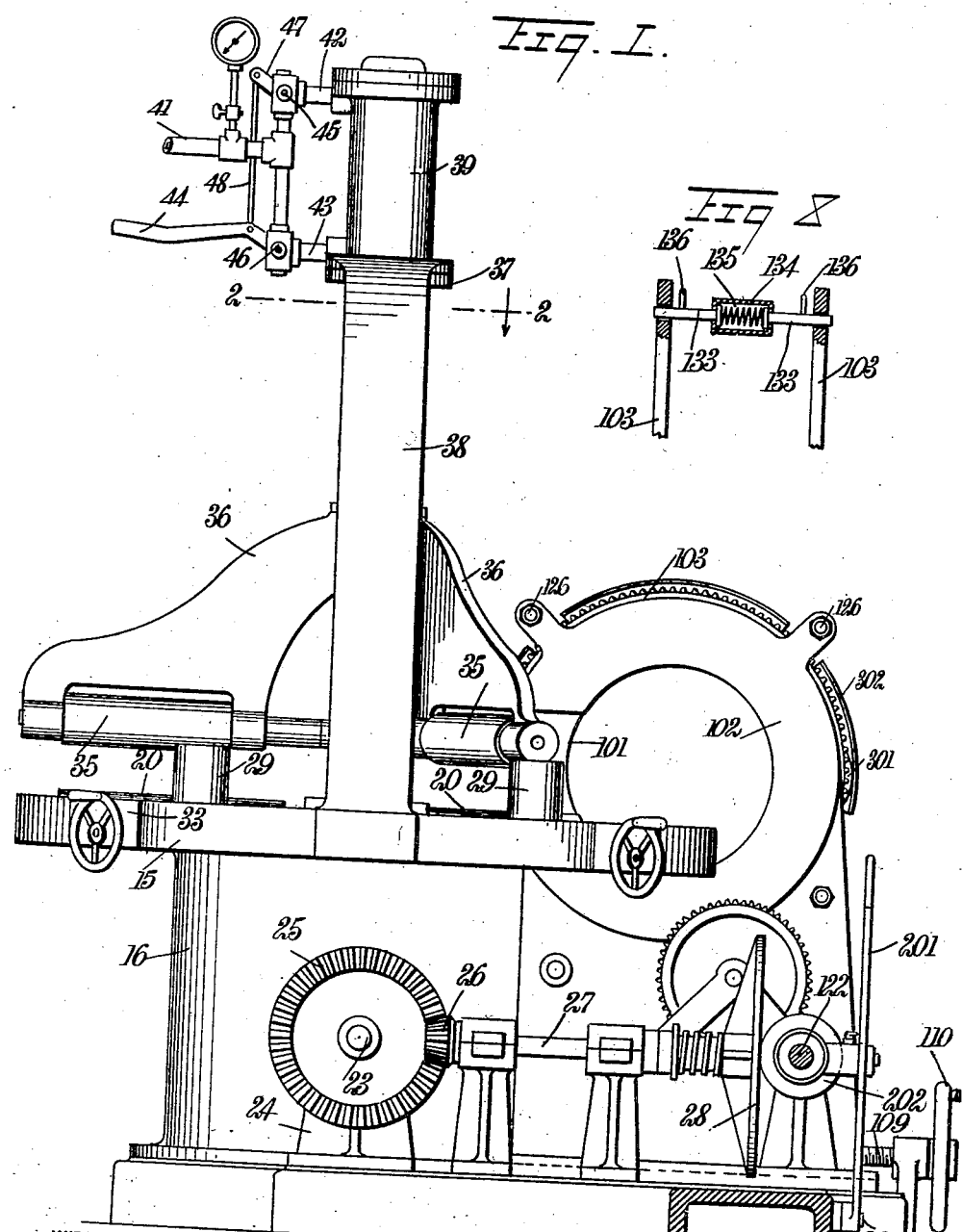
WITNESSES
H. J. Walker
INVENTOR
Joseph W. Thropp
BY
ATTORNEYS

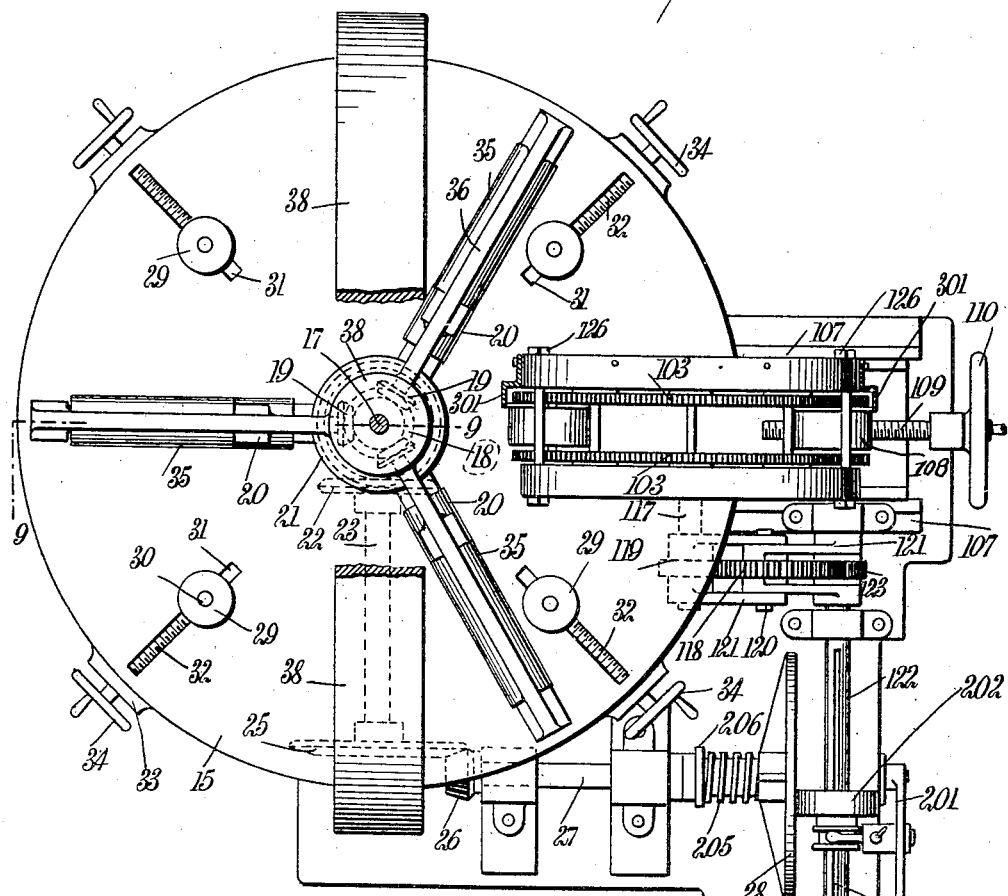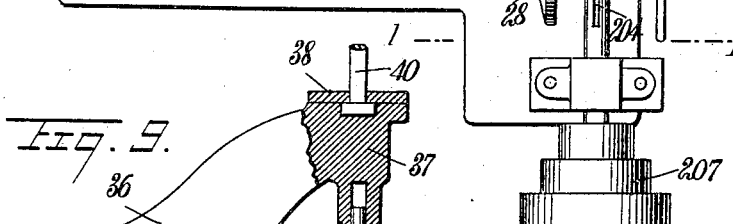

J. W. THROPP.
TIRE WRAPPING AND UNWRAPPING MACHINE.
APPLICATION FILED JAN. 19, 1912.
1,031,491.
Patented July 2, 1912.
4 SHEETS—SHEET 3.
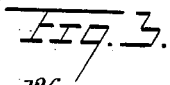
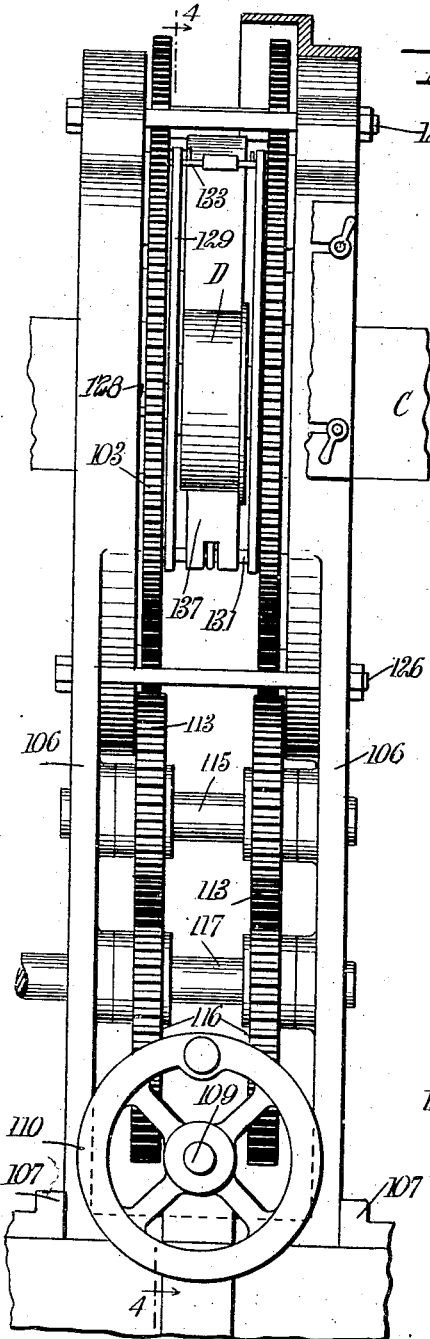
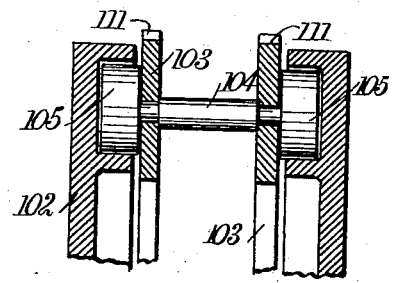
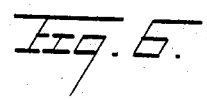
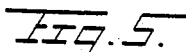
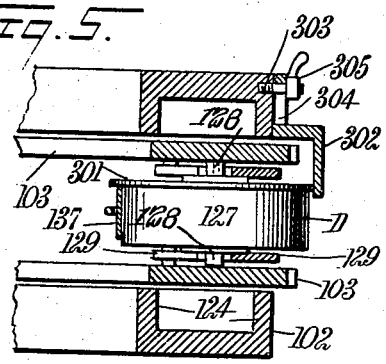
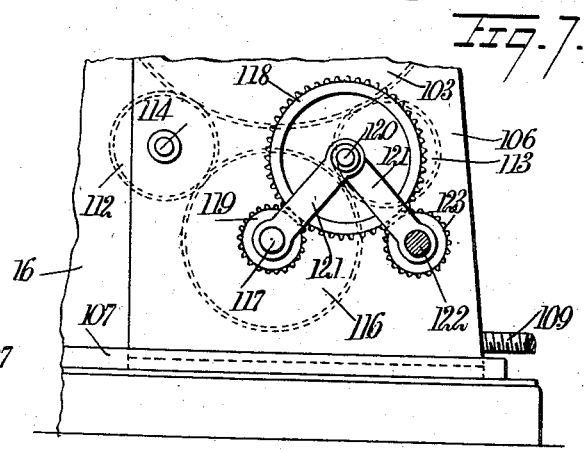
WITNESSES
H. J. Walker
INVENTOR
Joseph W. Thropp
BY Munn & Co
ATTORNEYS

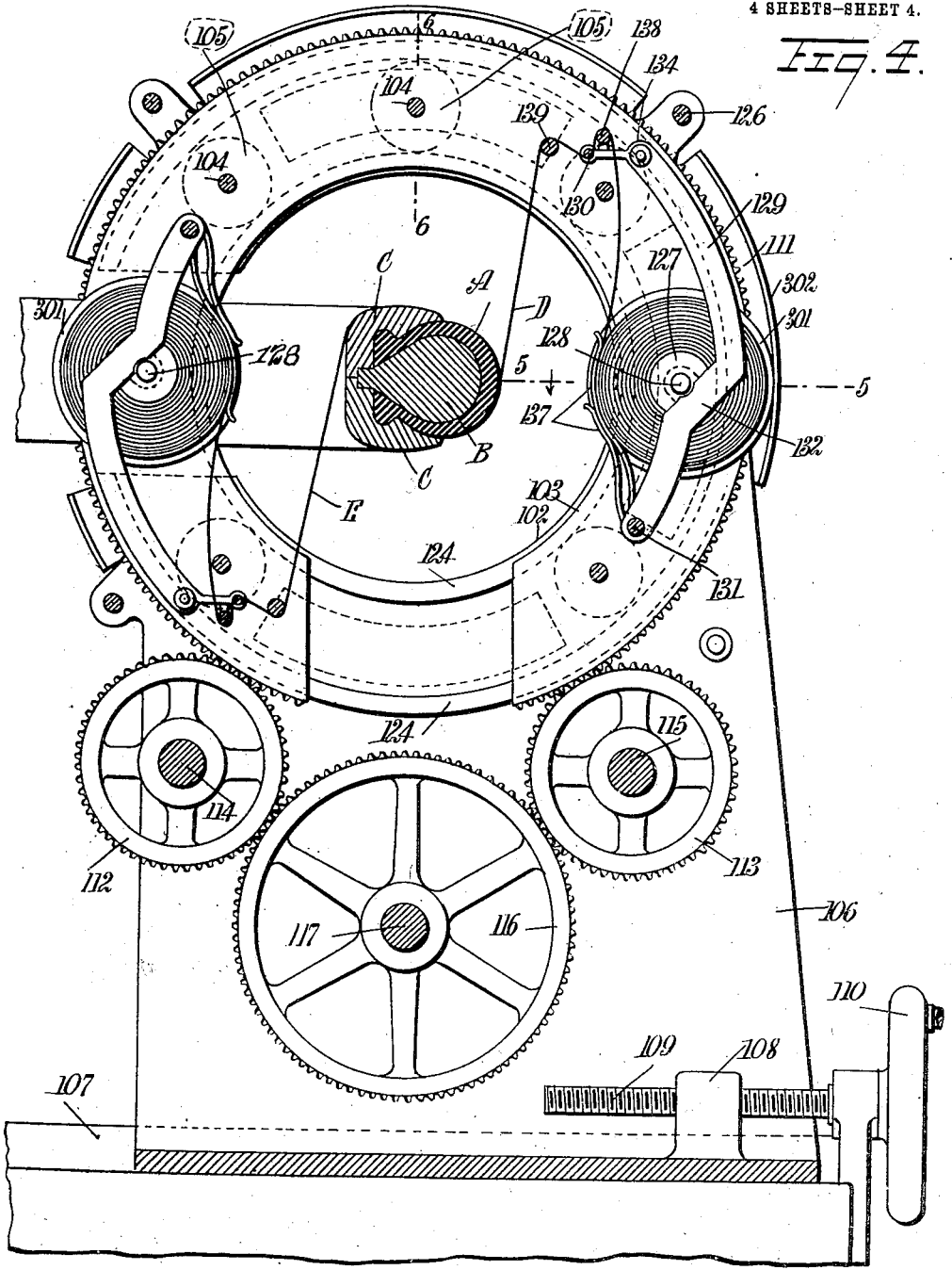

UNITED STATES PATENT OFFICE.

JOSEPH W. THROPP, OF TRENTON, NEW JERSEY.

TIRE WRAPPING AND UNWRAPPING MACHINE.

1,031,491.  Specification of Letters Patent.  Patented July 2, 1912.

Application filed January 19, 1912. Serial No. 672,106.

*To all whom it may concern:*

Be it known that I, JOSEPH W. THROPP, a citizen of the United States, and a resident of Trenton, in the county of Mercer and State of New Jersey, have invented a new and Improved Tire Wrapping and Unwrapping Machine, of which the following is a full, clear, and exact description.

This invention relates to that class of machines provided to wrap with a strip of cloth, a tire constructed in part or wholly from rubber or composition containing rubber, the wrapping being for the purpose of maintaining the tire in shape during the vulcanizing of the rubber or rubber-containing composition.

Heretofore tires, or shoes therefor, have been placed in suitable molds upon a horizontal table, to be moved thereon about the axis of the tire and through the center of the wrapping devices of the mechanism. Some form of rotary shuttle has been employed in most or all of the machines referred to. These shuttles have been provided with a bobbin or reel carrying the wrapping strip and rotatively or pivotally mounted on the said shuttle, to be carried about the tire and molds supporting the same.

The class of shuttles to which the one herein disclosed is most nearly allied have been provided with a supporting frame, and a gap, through which the continuous tire has been introduced, to be disposed in line with the center of the axis of the rotary shuttle. Many forms of closing devices have been provided for closing the gap in the shuttle after the introduction within the same of the tire, to form thereby a continuous ring.

Among the principal objects which the present invention has in view are: to provide a driving mechanism to operate to rotate the tire about its axis at an even rate of speed, to secure an even winding therefor; to provide a pressure for the tire and containing molds, arranged to be imposed on the tire and molds by the driving mechanism, to avoid any friction due to the movement of the tire; to provide a driving mechanism for the shuttle, arranged and constructed to avoid the need of a filler for the gap in the shuttle; to provide a shuttle constructed and arranged to carry a plurality of bobbins and take wrapper supply therefor; to provide means for readily and quickly removing or renewing the bobbins and supply for the shuttle; to provide means for manually and at will controlling the speed of the driving mechanism for the machine, to increase, diminish, or reverse the operation thereof; and to provide means for unwinding the wrappers from the tire, and for reversing the direction or pitch of the wrapping.

Reference is to be had to the accompanying drawings forming a part of this specification, in which similar characters of reference indicate corresponding parts in all the views, and in which—

Figure 1 is a side elevation of a machine constructed and arranged in accordance with the present invention, a portion of the base plate and driving shaft being shown in section, the section being taken on the line 1—1 in Fig. 2; Fig. 2 is a plan view, partly in section, showing the machine as constructed and arranged in accordance with the present invention, the section being taken on the line 2—2 in Fig. 1; Fig. 3 is an edge view, on an enlarged scale, showing the shuttle, bobbin, housing and adjusting mechanism therefor; Fig. 4 is a vertical section taken on the line 4—4 in Fig. 3; Fig. 5 is a cross section taken on the line 5—5 in Fig. 4; Fig. 6 is a vertical cross section taken on the line 6—6 in Fig. 4; Fig. 7 is a detail view showing a lower fragment of the housing for the shuttle, together with the driving and transmission mechanisms therefor; Fig. 8 is a detail view in section, showing the locking means for holding the bobbins and tension devices coöperating therewith, in position; and Fig. 9 is a vertical section of a fragment of the overhead spider and operating table, showing the driving mechanism for the feed rollers mounted thereon, the section being taken on the line 9—9 in Fig. 2.

For convenience of description of the construction, as shown in the accompanying drawings, the instrumentalities composing the machine have been grouped, and will be described in their grouped relation. Thus, the supporting table, pressure mechanism, guiding devices and driving mechanism are grouped under the general heading of "Feeding mechanism"; the shuttle, bobbins, and driving mechanism therefor are grouped under the heading of "Winding mechanism"; under the heading of "Controlling mechanism" are grouped the variable speed, reversing mechanism and general driving mechanism connected therewith, together with devices for controlling the operation of the same; and a further grouping has been assigned to what is herein named the "Unwinding mechanism."

*Feeding mechanism.*—As seen in the drawings, the operating table 15 is supported on a pedestal 16. At the center of the pedestal, and vertically mounted therein is a driving shaft 17. The shaft 17 is provided with a bevel wheel 18 at the top thereof, which wheel is meshed with bevel wheels 19, 19, fixedly mounted on the shafts of the rollers 20, 20. Adjacent the lower end of the shaft 17, it is provided with a large driving gear wheel 21, which is meshed with a similar gear wheel 22. The wheel 22 is fixedly mounted upon a transmission shaft 23, which is provided with suitable bearings inside the pedestal 16, and is supported outside of the said pedestal in bearings formed in a standard 24. At the outer end of the shaft 23, it is provided, fixedly attached thereto, with a bevel gear wheel 25. The teeth of the gear wheel 25 are meshed with the teeth of a bevel pinion 26 fixedly mounted upon a transmission shaft 27. At the end of the shaft 27 opposite that having the pinion 26, is slidably mounted a friction disk 28, hereinafter described in connection with the controlling mechanism. It will suffice at the present time to state that, by means of the controlling mechanism for driving the disk 28 and shaft 27 connected therewith, the rotation of the shafts 27, 23 and 17 is reversed at the will of the operator. By reversing the said shafts, the rollers 20, 20 are reversed in their action, operating to rotate the tire and containing mold therefor, about the center of the table 15 and the center of said tire. It will be understood that when the said tire is placed on the table 15, it is supported directly upon the rollers 20, and is centered therewith by means of vertical guide wheels 29, 29. The wheels 29, 29 are mounted upon stud shafts 30, set up from slide blocks of any suitable construction, which are mounted in slots 31, 31, disposed radially in the table 15. The blocks upon which the wheels 29 are supported are pivotally and permanently secured to feed screws 32, 32. The threads of the feed screws 32 register with threads in tap holes formed in bosses 33 formed at the edge of the table 15, as seen best in Fig. 2. Each of the screws 32 is provided with a hand wheel 34 for operating the screw, to advance or retract the wheels 29. No detail of the block supporting the shafts 30, 30 is shown. Any suitable form of mechanism to accomplish the purpose may be adopted in the construction of the machine, to adjust the wheels 29, 29 to and from the center of the table 15.

When the tire A, provided with its core B and external molds C, C, is placed upon the table 15 and upon the roller 20 thereof, the wheels 29, 29 are adjusted to center the tire and parts connected therewith to the table 15 or the shaft 17, the attendant moving the wheels 29 toward and away from the center of the table by means of the wheels 34. The wheels 29 may be adjusted to produce any suitable pressure on the tire at the periphery thereof, the tire being rotated by the rollers 20 and by rollers 35, past the wheels 29.

The rollers 35 are mounted in bearings formed in the lower end of spider arms 36. The arms 36 are radiated from a head 37, which bears upward against the under surface of a yoke standard 38, rigidly connected to, or integrally formed with, the table 15. The spider arms 36 and rollers 35 are permanently located, the said rollers 35 being at all times superposed above the rollers 20. Any suitable means for preventing the rotation of the said spider arms and parts connected therewith may be adopted. The spider arms 36 and rollers 35 are lifted and lowered by compressed air, steam, or water, introduced into a cylinder 39, above or below a piston mounted therein, to which a piston rod 40 is connected. Any of the fluids above mentioned is admitted from the supply pipe 41 to either of the nipples 42, 43, by shifting a hand lever 44, to vary the opening of valves 45 and 46. The valve 45 is provided with a short operating lever 47, which is connected by means of a rod 48 with the lever 44. In this manner, a harmony of operation is insured between the two valves 45 and 46. When the lever 44 is lowered, as seen in Fig. 1, the valves 45 and 46 are so disposed that the valve 45 is open while the valve 46 is closed. The fluid, therefore, entering from the supply pipe 41 to above the piston in the cylinder 39, depresses the piston, piston rod 40, head 37, and arms 36, 36, together with the rollers 35, 35 connected therewith.

When the tire and housing therefor are disposed on the rollers 20, the pressure exerted in the cylinder 39 is imposed, by the rollers 35, upon the tire and housings. The rollers 20 and 35 are formed to the same diameter, to secure unanimity of surface travel. To drive the rollers 35, the shaft of each roller is provided with a bevel pinion 49, the teeth whereof are meshed with a transmission bevel gear 40. The bevel gear 50 is rotatively mounted in the head 37, and is provided with a shaft 51, the lower end of which is rectangular in shape, to fit a rectangular socket provided in the bevel wheel 18 and shaft 17.

The length of the shaft 51 is such as to insure the insertion of the end thereof within the rectangular socket of the shaft 17 when the rollers 35 rest firmly upon the tire A and the parts connected therewith. In this position, it will be understood that the rotation of the shaft 17 to drive the roller 20 will likewise operate to drive, at an equal rate of speed, the rollers 35. By arranging the wheel 19 and pinion 49 as seen in Fig. 9 of drawings, the direction of rotation of the rollers is relatively reversed to secure the same direction of movement in the adjacent sections of the periphery. In this manner, the rollers 20 and 35 coöperate to rotate the tire about the center of the table 15.

After the tire has been wrapped, the lever 44 may be raised to close the valve 45 and to open the valve 46, thereby reversing the operation of the piston in the cylinder 39, resulting in elevating the spider arms 36 and rollers 35 carried thereby. The shaft 51 is also, by this action, elevated from engagement with the socket in the shaft 17 and removed above the surface of the table 15 sufficiently to permit the withdrawal of the tire thereunder.

It is evident from the foregoing that the drag or surface friction is removed from the tire A, and the wrappings applied thereto during the operation of the machine; and further, it is evident that the feed of the tire is, by the mechanism above described, more constant and steady than where one set of rollers is depended upon to feed the tire.

*Winding mechanism.*—When the tire is placed on the feed table 15 and upon the rollers 20 thereof, it is passed through a gap 101 formed in the housing 102 for a shuttle 103, and also through a gap formed between the ends of the said shuttle. When the tire has been adjusted upon the table by means of the wheels 29, and when the rollers 35 have been lowered to press upon the said tire in the manner above described, one end of each of the wrapper strips D and E is securely fastened to the tire and the molds holding the same. The machine is now in position to be operated.

The shuttle 103 is formed of two flat ring plates secured together by means of pins 104, 104, spaced apart thereon. The pins 104 form bearings at the outer side of the shuttle, for rollers 105, 105. Any suitable means for maintaining the separation of the ring plates forming the shuttle 103 may be employed. The plates forming the shuttle 103 are each cut away to form a gap corresponding in dimensions to the gap 101 formed in the housing 102. When the gaps in the shuttle and in the housing correspond, the entrance to the interior of the shuttle housing is clear, for the introduction of the tire and members connected therewith. It is desired that the shuttle should be concentric with the tire and members connected therewith, so that the draw of the wrapper strips D and E should be equal at all times with the operation of the machine. For this purpose, the housing 102 is provided with a separate standard 106. The standard 106 is slidably mounted on gibs 107 formed in the base plate of the pedestal 16. From the base of the standard 106 is raised a lug 108, which is provided with a screw-threaded perforation to receive a feed screw 109. The screw 109 is of usual construction, and is provided with a hand wheel 110, by which the screw is manipulated to move the standard 106 on the gibs 107. The gibs 107 are so disposed that the housing 102 and shuttle mounted thereon are moved toward or away from the center of the table 15, said table being suitably slotted to provide a passageway for the shuttle 103.

The ring plates forming the shuttle 103 are each provided with gear teeth formed thereon, by which the said shuttle is driven. The gear teeth 111 thus formed mesh with the teeth of the gear wheels 112 and 113. The wheels 112 and 113 are provided in pairs disposed on each side of the space between the plates forming the shuttle, each pair being mounted upon a short shaft 114, 115. The shafts 114 and 115 have suitable bearings formed in the side plates of the standard 106, as best seen in Fig. 3 of drawings. The wheels 112 and 113 are spaced apart a distance greater than the gap between the end of the plates forming the shuttle 103. By this arrangement, there is secured at all times an engagement between the gear teeth 111 of the shuttle and one or other of the pairs of wheels 112, 113. The wheels 112 and 113 are equal in diameter, and are each engaged with a driving gear wheel 116, mounted fixedly on a shaft 117. The shaft 117 is suitably mounted in bearings formed in the side pieces of the standard 106, and is extended at one side thereof, to engage the transmission gear wheel 118, as seen best in Fig. 7. To engage the wheel 118, the shaft 117 is provided with a pinion 119.

The wheel 118 is supported on a short shaft 120, to which is pivotally connected strap links 121, 121. The links 121, 121 are likewise pivotally connected with the shaft 117 and with a shaft 122, the latter constituting the main driving shaft of the machine. The shaft 122 is pivotally connected with the wheel 118 by means of a pinion 123, with which the said wheel 118 is geared. The transmission from the shaft 122 to the shaft 117 through the intermediate gear wheel 118 is necessitated by the fact that though the shaft 122 is permanent in its relation to the base plate of the machine, the shaft 117, being mounted in the standard 106, moves therewith away from the shaft 122, or approaches the same, in accordance with the operation of the screw 109.

During the rotation of the shuttle 103, the same is supported and carried by the gear wheels 112 and 113, and the rollers 105. The rollers 105 travel on raised flange-like tracks 124, 124, set inward from the housings 102. It will be noted that the number of rollers 105 is sufficient to avoid any sagging or vibration of the shuttle when the rollers pass over the gap 101 in the housing 102. The housings are each provided with bolting lugs 125, through which are passed bolts 126, which, when firmly secured, render the structure of the housing 102 sufficiently rigid for all purposes for which it is intended.

The bobbins employed in the present invention for holding the wrapper strips D and E are rollers 127, having each at the ends thereof trunnions 128. Suitable bearings are provided in the ring plates forming the shuttle 103, the bearings being preferably open sockets, into which the trunnions 128 may be dropped. To hold the trunnions 128 in position in the bearings provided in the plates of the shuttle, levers 129, 129 are provided. The levers 129 are bifurcated in form, being united at the free end by pins 130. Each of the arms of the lever 129 is pivoted upon a shaft 131 extended between the plates of the shuttle 103. Intermediate the free and pivoted ends of the lever 129, the lever is provided with a straight portion 132, which covers the pocket bearings of the trunnions 128, as seen best in Fig. 4 of drawings. In the normal position of the lever 129, in which it closes the bearing provided for the said trunnions, the lever is held by split pins 133, 133 (see Fig. 8 of drawings). The pins 133, 133 are suitably connected by the boxed end 134 of the arms of the lever 129. Within the boxed end 134 is mounted a spiral spring 135, which spring normally presses outward the pins 133, to insert the same within perforations provided in the plates forming the shuttle 103 (see Fig. 8 of drawings). To retract the pins 133, 133 to release the lever 129, there are provided operating pins 136, 136.

When the operator engages the pins 136, 136 with finger and thumb, he may retract the pins to liberate the ends thereof and the lever 129. By then lifting the lever 129 the roller 127 may be lifted from the bearing provided therefor in the shuttle 103. When a replenished bobbin or roller 127 has been installed in the socket bearing, the levers 129 are dropped back into position, the pins 133 snapping into engagement with the perforations provided for them in the plates of the shuttle 103.

To provide a tension for the wrapper strips D and E, I have provided drag springs 137, 137. The springs 137 are anchored to the shafts 131, and are adapted to press upon the surface of the wrapper strip carried by the roller 127. The strip is threaded from under the spring 137, over the pins 138 and 130 mounted at the free end of the lever 129, as seen in Fig. 4 of drawings. From under the pin 130, the strip is extended over a stationary pin 139 secured between the plates forming the shuttle 103. From the pins 139, the strips D and E are carried direct to the article to be wrapped.

It will be understood that the shuttle operates in one direction only, and at a uniform rate of speed, being connected, through an unchanging transmission gear chain, with the driving shaft 122. As indicated above, the rollers 20 and 35 are rotated at will at variable speeds and in different directions. It will be readily seen by this that as the speed of rotation of the tire is slowed, the lap of the wrapper strips will be diminished, resulting in a deeper or thicker layer of wrapper for each rotation of the tire. As it is the object of this machine to expedite the operation of wrapping, this is accomplished by mounting two, and if it be desired, more, bobbins or rollers 127 to carry the wrapper supply in the shuttle, for it is equally evident that when employing an increased number of wrapper strips, the speed of the feed rollers for the tire may be increased, and the operation of wrapping proportionately expedited. Thus, in the present machine, the normal feed of the tire is increased above that usually employed, in proportion as the number of bobbins are increased over that heretofore employed; to wit, a single bobbin.

It will be observed that when the wrapper strips D and E are laid on the tire, the one laps the top of the other as the shuttle is rotated, and that the amount of lap depends on the speed of the tire feed.

If, in the operation of the machine, the attendant observes that the layers are too thick, he may, by shifting the lever 201 and the friction wheel 202 connected therewith, increase the speed of the rollers 20 and 35 and the consequent speed of the tire feed.

*Controlling mechanism.*—The lever 201, above referred to, constitutes a part of what has been styled the "controlling mechanism." The lever 201 is pivotally mounted at 203 on the base of the machine, and is suitably connected with the friction wheel 202. The wheel 202 is suitably mounted on the shaft 122, being held non-rotatively thereon by a feather 204. The periphery of the wheel is provided with any suitable frictional surface, and bears against the face of the disk 28 above described as being slidably mounted on the shaft 27. The disk 28 is moved toward the wheel 202 by a spiral spring 205, a collar 206 being provided on the shaft 27 to operate as a brace for the spring 205, while forcing forward the disk 28.

At the outer end of the shaft 122 are provided a cluster of driving pulleys 207, adapted to be belt-driven from any suitable power source.

It will be understood that as the wheel 202 is moved from the center of the disk 28 to the periphery thereof, the speed transmitted from the shaft 122 to the shaft 27 is diminished, the diminution being equal to the ratio of the diameter of the wheel 202 to the path followed by the said wheel on the disk 28. The greater the diameter of the path of the disk 28, the slower the speed transmitted from the shaft 122 to the shaft 27. It will also be understood that the direction of rotation of the shaft 122 being constant, the direction of rotation of the shaft 27 is reversed whenever the wheel 202 passes to opposite sides of the center of the disk 28. The lever 201 is moved to reverse the rotation of the shaft 27 and the rollers 30 and 35 connected therewith when in the course of operation it is desired to unwind the wrapper strips from the tire, which operation is usually performed after the tire has been subjected to the steam bath employed in the process of curing the same.

*Unwinding mechanism.*—Whereas, in the operation of winding the wrapper strips upon the tire, the ends thereof are preliminarily secured to the tire and molds, in the operation of unwinding, the ends of the strips are each respectively secured upon a roller 127, to wind the said strips thereon as the shuttle 103 is rotated. To rotate the said rollers, each is provided with an extended flange 301, to engage friction segments 302 disposed on the housing 102, as seen best in Figs. 4 and 5 of drawings. The segments 302 are moved manually into and out of operative position, being guided thereto by bolts 303 and a slot 304. Each of the bolts 303 is furnished with a clamp nut 305, which, when set up against the segments 302, holds the same in position. It will be understood that the segments 302 are moved out of the path of the flange 301 when the tire is being wrapped, and that the said segments are moved into the path of the said flange only when the strips D and E are to be unwrapped.

When the segments 302 have been adjusted to engage the flange 301, the rollers 127 are rotated in a direction the reverse of that to which they are moved while the strips are being unwound therefrom. The length of the segments 302 is designed to take up the full slack of the wrappers removed from the tire and mold, and to draw the same therefrom, if adhered thereto. The rotation of the rollers 127 is calculated to take up the full supply of the strips D and E, when, due to the increasing diameter of the rollers 127 and the strip wound thereon, the peripheral travel of the bobbin exceeds the supply. The flange 301 will slide on a part of the surface of the segments 302, thus avoiding any breakage of the wrappers D and E.

As above stated, during the unwinding of the strips above referred to, the wheel 202 has been disposed on the disk 28, to that side of the center of said disk which reverses the shaft 27, causing the rollers 20 and 35 to reverse the feed rotation of the tire held thereon.

Having thus described my invention, I claim as new and desire to secure by Letters Patent:—

1. A machine such as described, having a rotary ring shuttle provided with gear teeth peripherally arranged and cut away to form a gap in the said ring; a driving mechanism for said shuttle, having a plurality of driving wheels spaced apart a distance greater than the said gap, to maintain constant the driving engagement with said shuttle; a housing to support and guide said shuttle, said housing having a gap formed therein; and a tire-feeding mechanism, embodying a plurality of driven rollers to engage the tire at opposite sides thereof and adapted to move the same through the center of said shuttle.

2. A machine such as described, having a rotary ring shuttle provided with a gap to permit the passage therethrough of a tire, to the interior of said shuttle; a plurality of driving wheels, each to operatively engage the periphery of said shuttle at points separated a distance greater than the length of said gap, to maintain constant a driving engagement between said shuttle and one of said wheels; means for driving said wheels; and a tire-feeding mechanism adapted to move the tire through the center of said shuttle.

3. A machine such as described, having a rotary ring shuttle provided with a gap to permit the passage therethrough of a tire, to the interior of said shuttle; a plurality of driving wheels, each to operatively engage the periphery of said shuttle at points separated a distance greater than the length of said gap, to maintain constant a driving engagement between said shuttle and one of said wheels; means for driving said wheels; a tire-feeding mechanism adapted to move the tire through the center of said shuttle; and a plurality of strip-carrying bobbins pivotally mounted on said shuttle.

4. A machine such as described, having a rotary ring shuttle provided with a gap to permit the passage therethrough of a tire, to the interior of said shuttle; a plurality of driving wheels, each to operatively engage the periphery of said shuttle at points separated a distance greater than the length of said gap, to maintain constant a driving engagement between said shuttle and one of said wheels; means for driving said wheels; a tire-feeding mechanism adapted to move the tire through the center of said shuttle; a plurality of strip-carrying bobbins pivotally mounted on said shuttle; and a plurality of tension devices to retard the rotation of said bobbins.

5. A machine such as described, having a rotary ring shuttle provided with a gap to permit the passage therethrough of a tire, to the interior of said shuttle; a plurality of driving wheels, each to operatively engage the periphery of said shuttle at points separated a distance greater than the length of said gap, to maintain constant a driving engagement between said shuttle and one of said wheels; means for driving said wheels; a tire-feeding mechanism adapted to move the tire through the center of said shuttle; and means for moving said shuttle independently of said tire-feeding mechanism.

6. A machine such as described, having a rotary ring shuttle provided with a gap to permit the passage therethrough of a tire, to the interior of said shuttle; a plurality of driving wheels, each to operatively engage the periphery of said shuttle at points separated a distance greater than the length of said gap, to maintain constant a driving engagement between said shuttle and one of said wheels; means for driving said wheels; a tire-feeding mechanism adapted to move the tire through the center of said shuttle; means for moving said shuttle independently of said tire-feeding mechanism; and a driving mechanism for said shuttle, embodying a permanently located driving shaft; a roving driving shaft mounted in permanent relation to said shuttle; and a train of transmission gear wheels, embodying wheels fixedly mounted on said shafts and an intermediate transmission wheel operatively engaging the wheels on said shafts and being held thereto by links.

In testimony whereof I have signed my name to this specification in the presence of two subscribing witnesses.

JOSEPH W. THROPP.

Witnesses:
 ANDREW J. BERRIEN,
 THEO. R. EARLING.